United States Patent
Budnicki et al.

(10) Patent No.: US 12,418,154 B2
(45) Date of Patent: Sep. 16, 2025

(54) METHOD FOR AMPLIFYING AN ULTRASHORT LASER PULSE AND METHOD FOR DESIGNING AN AMPLIFICATION SYSTEM

(71) Applicant: TRUMPF Laser GmbH, Schramberg (DE)

(72) Inventors: Aleksander Budnicki, Waldkirch (DE); Raphael Scelle, Villingen-Schwenningen (DE)

(73) Assignee: TRUMPF LASER GMBH, Schramberg (DE)

( * ) Notice: Subject to any disclaimer, the term of this patent is extended or adjusted under 35 U.S.C. 154(b) by 698 days.

(21) Appl. No.: 17/881,711

(22) Filed: Aug. 5, 2022

(65) Prior Publication Data
US 2022/0385019 A1    Dec. 1, 2022

Related U.S. Application Data

(63) Continuation of application No. PCT/EP2021/053110, filed on Feb. 9, 2021.

(30) Foreign Application Priority Data

Feb. 11, 2020   (DE) .................... 10 2020 201 693.3

(51) Int. Cl.
*H01S 3/30* (2006.01)
*H01S 3/00* (2006.01)
*H01S 3/067* (2006.01)

(52) U.S. Cl.
CPC .......... *H01S 3/0057* (2013.01); *H01S 3/0078* (2013.01); *H01S 3/0092* (2013.01);
(Continued)

(58) Field of Classification Search
CPC .... H01S 3/0057; H01S 3/0078; H01S 3/0092; H01S 3/06754; H01S 3/0085; H01S 3/06758; H01S 2301/08
See application file for complete search history.

(56) References Cited

U.S. PATENT DOCUMENTS

| 8,774,240 B2 | 7/2014 | Cheriaux |
| 2008/0089366 A1 | 4/2008 | Liu |

(Continued)

FOREIGN PATENT DOCUMENTS

| DE | 102008047226 A1 | 4/2010 |
| KR | 20180126045 A | 11/2018 |

OTHER PUBLICATIONS

Julijanas eludeviius et al., "Optimization of pulse compression in a fiber chirped pulse amplification system by adjusting dispersion parameters of a temperature-tuned chirped fiber Bragg grating stretcher," Journal of the Optical Society of America B, May 2015, pp. 812-817, vol. 32, Issue 5, Optica Publishing Group, Washington, DC,USA.

(Continued)

*Primary Examiner* — Kinam Park
(74) *Attorney, Agent, or Firm* — LEYDIG, VOIT & MAYER, LTD.

(57) ABSTRACT

A method for amplifying an ultrashort laser pulse includes: a) stretching the ultrashort laser pulse in time, b) amplifying the time-stretched laser pulse, c) compressing the amplified time-stretched laser pulse, with at least one gain phase contribution selected from a group consisting of a gain dynamics phase contribution of the laser pulse that emerges as a change in a nonlinear phase on account of gain dynamics in step b), a gain bandwidth phase contribution of the laser pulse that emerges as a change in the nonlinear phase on account of a gain bandwidth in step b), and a combination thereof, being compensated by virtue of d) an (Continued)

additional phase contribution being imparted on the laser pulse prior to step c) and/or e) a spectrum of the laser pulse being changed, in such a way that the at least one gain phase contribution is compensated after step c).

20 Claims, 1 Drawing Sheet

(52) U.S. Cl.
CPC ........ *H01S 3/06754* (2013.01); *H01S 3/0085* (2013.01); *H01S 3/06758* (2013.01); *H01S 2301/08* (2013.01)

(56) References Cited

U.S. PATENT DOCUMENTS

| | | |
|---|---|---|
| 2011/0242646 A1 | 10/2011 | Schimpf et al. |
| 2015/0255942 A1 | 9/2015 | Fermann et al. |
| 2020/0303893 A1 | 9/2020 | Yusim et al. |

OTHER PUBLICATIONS

He, et al., "High Energy Femtosecond Fiber Chirped Pulse Amplification System with Adaptive Phase Control," *Optics Express* 16, 8, pp. 5813-5821, Apr. 14, 2008, The Optical Society, Washington D.C., US.

Song, et al., "Optimization of Nonlinear Compensation in a High-Energy Femtosecond Fiber CPA System by Negative TOD Fiber," *IEEE Photonics Journal* 9, 2, pp. 1-10, Apr. 2, 2017, Institute of Electrical and Electronics Engineers, Manhattan, NY, USA.

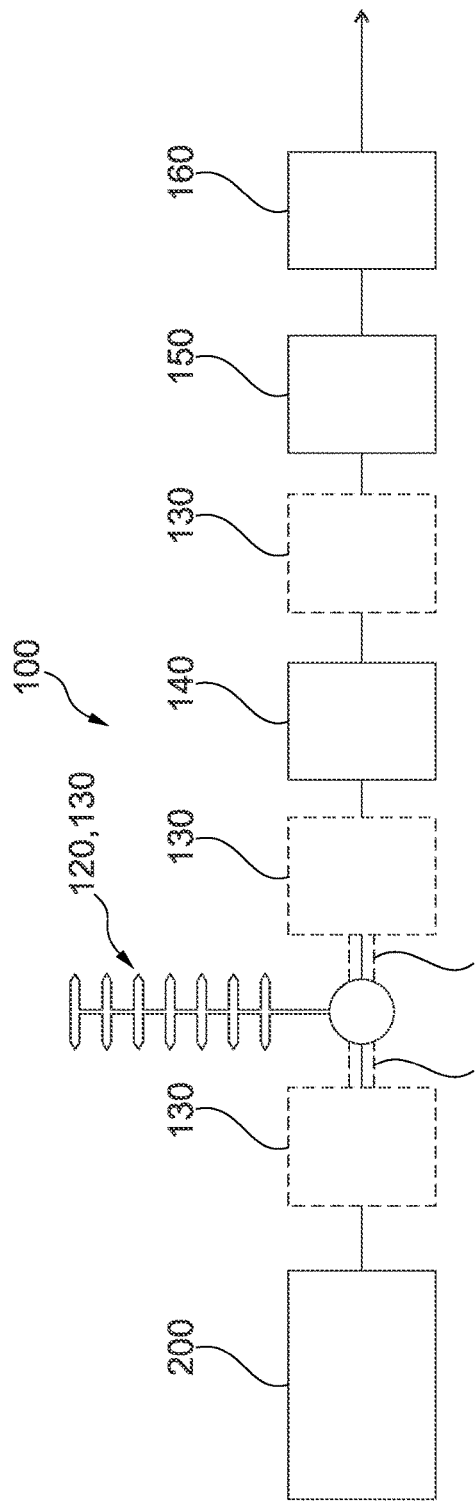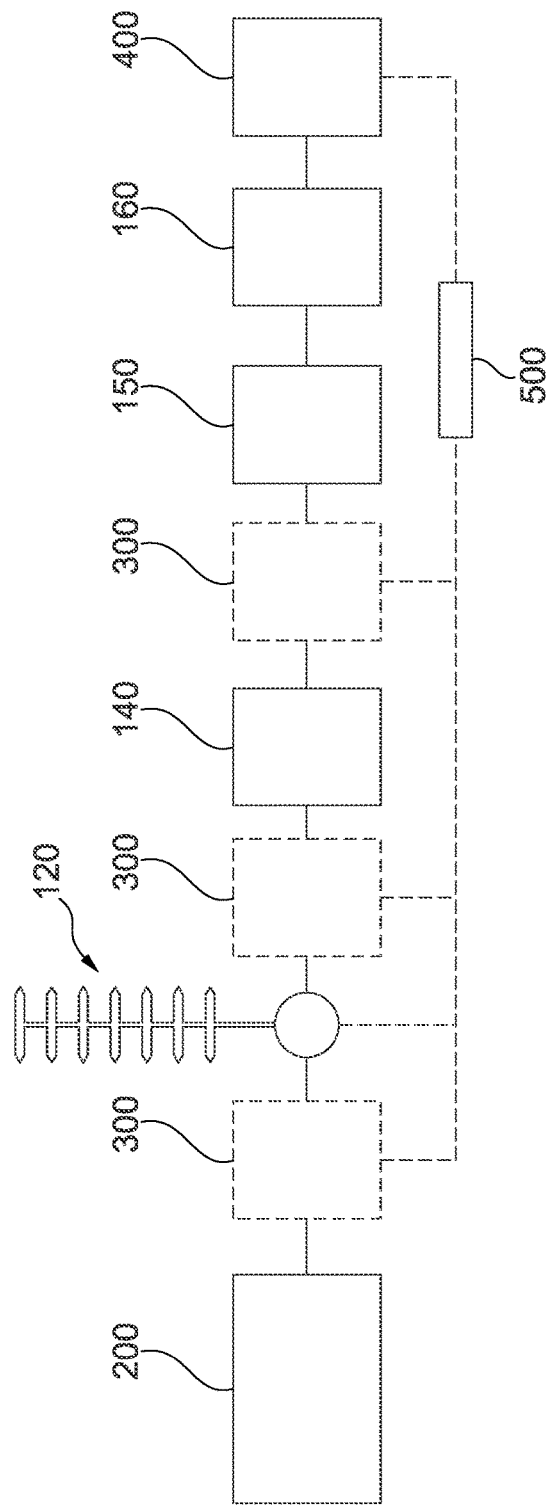

METHOD FOR AMPLIFYING AN ULTRASHORT LASER PULSE AND METHOD FOR DESIGNING AN AMPLIFICATION SYSTEM

CROSS REFERENCE TO RELATED APPLICATIONS

This application is a continuation of International Application No. PCT/EP2021/053110 (WO 2021/160621 A1), filed on Feb. 9, 2021, and claims benefit to German Patent Application No. DE 10 2020 201 693.3, filed on Feb. 11, 2020. The aforementioned applications are hereby incorporated by reference herein.

FIELD

Embodiments of the present invention relate to a method for amplifying an ultrashort laser pulse, and to a method for designing an amplification system.

BACKGROUND

Ultrashort laser pulses are typically amplified with the aid of what is known as CPA (chirp pulse amplification) technology, with an ultrashort laser pulse produced in particular by a laser pulse source, in particular an ultrashort pulse laser which is also referred to as a seed laser, being stretched in time and with a time-stretched laser pulse being obtained. This time-stretched laser pulse then is amplified—in particular in at least one amplifier stage or an amplification chain made of a plurality of amplification stages—, with an amplified time-stretched laser pulse being obtained. In this case, stretching the laser pulse in time serves in particular to avoid a damage or destruction threshold of the at least one amplifier stage being exceeded by the pulse power of the laser pulse, and to reduce unwanted nonlinear processes/effects. Subsequently, the amplified time-stretched laser pulse is once again compressed in time, as a result of which an amplified ultrashort laser pulse is ultimately obtained.

SUMMARY

A method for amplifying an ultrashort laser pulse includes the following steps: a) stretching the ultrashort laser pulse in time and obtaining a time-stretched laser pulse, b) amplifying the time-stretched laser pulse and obtaining an amplified time-stretched laser pulse, c) compressing the amplified time-stretched laser pulse and obtaining an amplified ultrashort laser pulse, with at least one gain phase contribution selected from a group consisting of a gain dynamics phase contribution of the laser pulse that emerges as a change in a nonlinear phase on account of gain dynamics in step b), a gain bandwidth phase contribution of the laser pulse that emerges as a change in the nonlinear phase on account of a gain bandwidth in step b), and a combination of the gain dynamics phase contribution and the gain bandwidth phase contribution, being compensated by virtue of d) an additional phase contribution being imparted on the laser pulse prior to step c) and/or e) a spectrum of the laser pulse being changed, in such a way that the at least one gain phase contribution is compensated after step c).

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows a schematic representation of an exemplary embodiment of an amplification system for carrying out an embodiment of a method for amplifying an ultrashort laser pulse; and FIG. 2 shows a schematic representation of an exemplary embodiment of a system for carrying out an embodiment of a method for designing an amplification system.

DETAILED DESCRIPTION

Ultrashort laser pulses are usually amplified with the aid of CPA technology, as discussed above. In the process, gain dynamics may arise in the at least one amplifier stage, in particular when retrieving a not insignificant fraction of the energy stored in the amplifier stage, which gain dynamics may lead to a pulse shape change of the laser pulse—in particular on account of a saturation of the gain. In particular, this problem arises whenever the at least one amplification stage is operated sufficiently close to or above its saturation. Furthermore, a spectral dependence of the gain, that is to say a gain bandwidth, may also contribute to a pulse shape change. The inventors have moreover recognized that, on account of the gain dynamics and/or on account of the gain bandwidth, there is a change in a phase accumulated on account of nonlinear effects, which is also referred to as a nonlinear phase below, in the at least one amplifier stage or amplifier chain, also referred to as amplification system in general. This change in the nonlinear phase, which is also referred to as gain phase contribution below and which may be a gain dynamics phase contribution, a gain bandwidth phase contribution, or a combination of the gain dynamics phase contribution and the gain bandwidth phase contribution, impairs the pulse quality of the laser pulse following compression, that is to say ultimately impairs the quality of the used beam obtained.

Embodiments of the present invention provide a method for amplifying an ultrashort laser pulse, in which at least one gain phase contribution of the laser pulse, selected from a group consisting of the gain dynamics phase contribution, the gain bandwidth phase contribution, and a combination of the gain dynamics phase contribution and the gain bandwidth phase contribution, is compensated by virtue of an additional phase contribution being imparted on the laser pulse prior to compression, in such a way that the at least one gain phase contribution is compensated following the compression. Alternatively or in addition, a spectrum of the laser pulse is changed in such a way that the at least one gain phase contribution is compensated after the compression. By way of the additional phase contribution and/or the change in the spectrum of the laser pulse, the method proposed here facilitates a compensation of the at least one gain phase contribution, in such a way that a deterioration in the pulse quality after the compression is reduced, and preferably avoided. In this way, it is possible to obtain a high quality, ultrashort, amplified laser pulse that can be used in an improved fashion, preferably without restrictions, for a sought-after application, be it material processing, for example laser cutting, laser welding or laser polishing, in particular micro-material processing, frequency conversion, or a scientific purpose, for example pumping OPCPA, or spectroscopy.

In particular, what was recognized according to embodiments of the invention is that the gain dynamics and/or the effect of the gain bandwidth, and the nonlinear effects that occur in the amplification system can be neutralized by way of suitable, quasi-complementary influencing of the laser pulse, in particular in such a way that, ultimately, the deformation produced in the amplification process in end effect produces a pulse shape that is well compressible despite the occurring nonlinearities. This can be obtained by the additional phase contribution and/or by changing the spectrum of the laser pulse. In particular, the additional phase contribution can be designed such that the at least one gain phase contribution is pre-compensated by the occurring nonlinearities. Alternatively or in addition, there can in particular be spectral filtering and/or spectral shaping, in such a way that a nonlinear phase is produced by the pulse shape in that case, said nonlinear phase being able to be compressed well together with the remaining phase contributions. The change in the spectrum of the laser pulse facilitates—in comparison with the additional phase contribution—an improved pulse quality in a greater pulse energy range since the additional phase contribution requires nonlinear effects to act as a compensation. However, these only occur at high pulse energies. Accordingly, a compressed laser pulse imparted with the additional phase contribution would have a reduced pulse quality after the compression in the case where the pulse energy is too low to produce nonlinear effects to a sufficient extent. By contrast, changing the spectrum does not immediately lead to a change in the phase, and so this procedure also works at lower pulse energies.

In this case, an ultrashort laser pulse is understood to mean, in particular, a laser pulse whose temporal bandwidth is in the ps- to fs-range. Preferably, the temporal pulse width of the compressed ultrashort laser pulse is no more than 10 ps, preferably a few 100 fs, or less.

A gain dynamics phase contribution is understood to mean, in particular, a change in the nonlinear phase of the laser pulse which arises from the gain, in particular in the at least one amplifier stage or in the amplifier chain, on account of the gain dynamics and from the nonlinear effects. In this case, this may be a temporal phase contribution and/or a spectral phase contribution.

A gain bandwidth phase contribution is understood to mean, in particular, a change in the nonlinear phase of the laser pulse which arises from the gain on account of the gain bandwidth of the gain medium, that is to say the spectral dependence of the gain, in particular in the at least one amplifier stage or in at least one amplifier of the amplifier chain, and from the nonlinear effects. In this case, this may be a temporal phase contribution and/or a spectral phase contribution.

Now, a gain phase contribution is understood to mean, in particular, the gain dynamics phase contribution or the gain bandwidth phase contribution or a combination of the gain dynamics phase contribution and the gain bandwidth phase contribution.

Accordingly, an additional phase contribution is understood to mean, in particular, a change in the phase of the laser pulse brought about in a targeted manner with the object of compensating the gain phase contribution. The additional phase contribution can be a temporal and/or a spectral phase contribution.

Consequently, it is possible that only the gain dynamics phase contribution is compensated. Alternatively, it is possible that only the gain bandwidth phase contribution is compensated. However, it is also possible that both the gain dynamics phase contribution and the gain bandwidth phase contribution—or a combination thereof—are compensated.

Depending on the specific design of the amplification system and of the ultrashort laser pulse, the gain dynamics phase contribution may dominate but it is also possible that the gain bandwidth phase contribution dominates. Consequently, it may optionally be possible—especially in a limit case—for the compensation of one of the two contributions to suffice to obtain an amplified ultrashort laser pulse with a high pulse quality. However, it is also possible for both contributions to be compensated in order to ensure a high pulse quality for the amplified ultrashort laser pulse.

In this case, nonlinear effects are understood to mean, in particular, effects that arise depending on the intensity of the laser pulse, especially at a high intensity. These effects are referred to as nonlinear since these include the square of the electric field strength of the laser pulse.

Gain dynamics are understood to mean that, in particular, the time-stretched laser pulse to be amplified and thus simultaneously the frequency components thereof experience a different gain at the temporal pulse start than at the temporal pulse end since the population inversion of the gain medium changes as a result of energy extraction—in particular at high pulse energies to be extracted, that is to say at high energies to be retrieved from the at least one amplifier stage. Since the time-stretched pulse is stretched by what is known as a chirp, it has different frequency components at the temporal pulse start than at the temporal pulse end. Consequently, the frequency components at the temporal pulse start, in particular, are amplified more than at the temporal pulse end, leading to a deformation of the pulse. By way of nonlinear effects, the deformation of the time-stretched pulse also has an effect on the pulse shape after the compression and ultimately leads to a worsened compression, that is to say a pulse deformation and/or a pulse duration lengthening in comparison with the temporal width of an undisturbed compressed laser pulse.

A gain bandwidth is understood to mean, in particular, that the gain, that is to say in particular a gain of the amplifier or the amplifier chain, has a spectral dependence and a finite bandwidth. Especially in the case of a non-optimal adaptation to the gain bandwidth of the spectrum of the laser pulse to be amplified, this leads to a spectral deformation of the laser pulse, which likewise leads to a deformation of the time-stretched laser pulse and, by way of the nonlinear effects, also has an effect on the temporal pulse shape after the compression. This may lead to a deteriorated compression, that is to say to a pulse deformation or pulse duration lengthening in relation to the temporal width of an optimally amplified laser pulse, in particular in the case of a spectrum that has not been or only slightly changed by way of the gain bandwidth.

The gain phase contribution being compensated means in particular that, on account of a possibly still remaining residual component of the gain phase contribution, a Strehl ratio of the laser pulse is no more than 5% less than in the case of complete avoidance or complete compensation of the gain phase contribution. Thus, the gain phase contribution—or the influence or effect of the gain phase contribution—need not be compensated to 100% in particular, but rather a compensation within the aforementioned scope is sufficient. However, the gain phase contribution is advantageously compensated to a greater extent such that, correspondingly, the Strehl ratio is less than 5% smaller than without the gain phase contribution, in particular less than 2%, preferably less than 1%. In this application, the Strehl ratio, also referred to as Strehl number, is understood to mean the ratio of the pulse peak power to the theoretical pulse peak power of a Fourier-limited, i.e., perfectly compressed, pulse. Hence, a perfectly compressing system would have a Strehl ratio of 1.

The gain phase contribution being compensated therefore means, in particular, that the influence or the effect of the gain phase contribution on the amplified ultrashort laser pulse is compensated, in particular by virtue of the Strehl ratio being optimized.

In a preferred embodiment, the spectrum of the laser pulse is changed before the time-stretched laser pulse is amplified, in such a way that the gain phase contribution is compensated after the compression.

In another preferred embodiment, the spectrum of the laser pulse is changed when the time-stretched laser pulse is amplified, in such a way that the gain phase contribution is compensated after the compression.

In another preferred embodiment, the spectrum of the laser pulse is changed after the time-stretched laser pulse has been amplified, in such a way that the gain phase contribution is compensated after the compression.

In another preferred embodiment, the spectrum of the laser pulse is changed before and after the time-stretched laser pulse has been amplified, in such a way that the gain phase contribution is compensated after the compression.

In another preferred embodiment, the spectrum of the laser pulse is changed before and when the time-stretched laser pulse is amplified, in such a way that the gain phase contribution is compensated after the compression.

In another preferred embodiment, the spectrum of the laser pulse is changed when and after the time-stretched laser pulse has been amplified, in such a way that the gain phase contribution is compensated after the compression.

In another preferred embodiment, the spectrum of the laser pulse is changed before, when and after the time-stretched laser pulse has been amplified, in such a way that the gain phase contribution is compensated after the compression.

According to embodiments of the invention, provision is made for at least one step selected from imparting the additional phase contribution and changing the spectrum of the laser pulse to be carried out when the ultrashort laser pulse is stretched in time. Alternatively or in addition, the at least one step is carried out before the ultrashort laser pulse is stretched. Alternatively or in addition, the at least one step is carried out after the ultrashort laser pulse has been stretched and before the time-stretched laser pulse is amplified. Alternatively or in addition, the at least one step is carried out when the time-stretched laser pulse is amplified. This allows the laser pulse to be influenced as desired before its compression, such that the at least one gain phase contribution is compensated on account of the appropriate influence by the at least one step no later than after the compression or else already before the compression, or optionally also as a result of the compression.

According to a preferred embodiment, the at least one step is changing the spectrum of the laser pulse in particular.

According to another preferred embodiment, the at least one step is imparting the additional phase contribution. The additional phase contribution is imparted on the laser pulse preferably during the stretching in time, or else during the amplification, in particular by means of an electro-optic modulator, preferably a Pockels cell, arranged in the amplifier chain. However, a preferred embodiment is also possible, within the scope of which the additional phase contribution is imparted on the laser pulse after the amplification, in particular by means of a volume Bragg grating (VBG).

According to embodiments of the invention, provision is made for the additional phase contribution to be imparted on the laser pulse by virtue of a stretcher being used for stretching the laser pulse in time, a suitably adapted time-of-flight profile being written into or impressed onto said stretcher on the basis of the wavelength for the ultrashort laser pulse. Consequently, the additional phase contribution can be easily imparted on the laser pulse concurrently with the stretching in time in the stretcher.

According to embodiments of the invention, provision is made for the suitably adapted time-of-flight profile to be statically written into or dynamically impressed onto the stretcher on the basis of the wavelength. The appropriately suitably designed stretcher can thus preferably be statically adapted to match the additional phase contribution, in particular by appropriately written grating pitches. However, it is also possible that a variably adaptable stretcher is used, in particular a thermally modifiable stretcher or a stretcher that is modifiable in tension-dependent fashion on the basis of a mechanical tensile force acting on the stretcher. In the latter case, the material of the stretcher can be stretched in particular by virtue of tensile stress being applied and preferably being varied in parameter-dependent fashion, in particular dependent on the additional phase contribution to be imparted. In particular, an optical fiber that can be mechanically stretched in appropriate fashion can be used as a stretcher. A temperature profile can preferably be applied in the case of a thermally modifiable stretcher, in particular by way of at least one Peltier element, preferably by way of a plurality of Peltier elements which, in particular, may be arranged distributed over a length of the stretcher. In this case, a relative distance of various Bragg elements of the stretcher from one another can be varied by suitable local temperature variations.

According to embodiments of the invention, provision is made for the spectrum of the laser pulse to be changed by virtue of a stretcher with a spectral filter written into or impressed onto it being used for stretching the ultrashort laser pulse in time. In particular, a fiber with a reflection grating with a reflection profile written into it can be used as a stretcher. Consequently, the change in the spectrum can be carried out in a particularly compact and installation space-saving manner, together with the stretching in time.

Alternatively or in addition, the spectrum of the laser pulse is preferably changed by virtue of the laser pulse being filtered by way of a spectral filter which—in the propagation direction of the laser pulse—is arranged upstream of the stretcher or downstream of the stretcher. This represents a particularly simple and flexibly adjustable embodiment of the spectral change.

Alternatively or in addition, the spectrum of the laser pulse is preferably changed by virtue of the laser pulse—in the propagation direction of the laser pulse—being guided through a fiber upstream of the stretcher or downstream of the stretcher, a spectral filter being written into the fiber. Thus, a fiber used for beam guidance in any case can be additionally used, in particular, to change the spectrum of the laser pulse.

Alternatively or in addition, the spectrum of the laser pulse is preferably changed by virtue of the laser pulse being spectrally filtered and/or spectrally shaped, before or while it passes through an amplifier in which or downstream of which self-phase modulation occurs. Self-phase modulation represents a substantial source of nonlinear phase contributions, with self-phase modulation occurring in particular within or downstream of a last amplifier of the amplifier chain, in particular a main amplifier. Whether self-phase modulation occurs however also depends on a spatial width of the laser pulse and a geometric design of the amplifier medium, with, depending on the structure of the amplifiers, self-phase modulation possibly also occurring upstream of a last amplifier or main amplifier, but in particular also upstream or downstream of a preamplifier, in the propagation direction. The laser pulse is preferably spectrally filtered and/or spectrally shaped before or when it experiences self-phase modulation—especially for the first time.

In particular, the spectrum of the laser pulse is preferably changed by filtering and/or shaping that is adapted to be complementary or an inverse to at least one effect or a combination of effects, selected from the gain dynamics and the gain bandwidth. In particular, a separate transmission filter or a transmission filter that has been written into a fiber can be used to this end. It is also possible that the reflectivity in a stretcher working in reflection is adapted in accordance with the desired spectral filtering in certain areas. Accordingly, the transmissivity can be adapted accordingly in the case of a stretcher working in transmission. According to another preferred embodiment, a temporally set pulse attenuator, in particular an acousto-optic modulator or an electro-optic modulator, in particular a Pockels cell, is used as an alternative or in addition to the spectral change of the laser pulse. This also facilitates spectral influencing since the laser pulse is preferably chirped such that the various frequency or wavelength components of the laser pulse can be addressed separately in time.

According to embodiments of the invention, provision is made for the time-stretched laser pulse to be amplified by an amplifier chain comprising a plurality of amplifiers. The spectrum of the laser pulse is changed by virtue of the laser pulse passing through at least one amplifier of the plurality of amplifiers within the amplifier chain, the gain bandwidth of said amplifier being suitably adapted to at least partly compensate the at least one gain phase contribution. Advantageously, the gain phase contribution can be compensated by virtue of, in particular, the gain bandwidth being adapted accordingly, at least for one amplifier of the amplifier chain. With the aid of the adapted gain bandwidth, the spectrum of the laser pulse is changed during amplification in this case, in particular spectrally shaped, such that the at least one gain phase contribution is at least partly compensated. It is preferably possible for the amplifier chain to comprise a plurality of amplifiers whose gain bandwidth has been suitably adapted.

According to embodiments of the invention, provision is made for at least one amplifier of the plurality of amplifiers whose gain bandwidth is suitably adapted by virtue of the amplifier having suitably adapted doping to be used to change the spectrum of the laser pulse. In this case, the doping can be adapted in particular by way of a suitable choice of at least one doping element or a combination of doping elements, and/or by a suitable choice of a doping amount and/or doping density, that is to say in particular of the corresponding number and/or number density of foreign atoms.

Alternatively or in addition, the gain bandwidth of the at least one amplifier is suitably adapted by virtue of the amplifier having a suitably adapted path length for the laser pulse within the amplifier, in particular a suitably adapted fiber length. For a given energy yield of the amplifier, the population inversion in the amplifier depends on the path length for the laser pulse through the amplifier, in particular on the fiber length of the amplifier designed as a fiber amplifier. Given a fixed energy yield and an increasing path length or fiber length, this yields in particular a lower population inversion and hence a spectral shift and/or deformation for the amplified laser pulse. By way of example, a red shift may occur in the case of ytterbium doping of the amplifier medium. Consequently, the spectrum of the laser pulse can be suitably changed by adapting the path length, in particular the fiber length, in order to at least partly compensate the at least one gain phase contribution.

According to embodiments of the invention, provision is made for at least 30%, preferably at least 50%, preferably at least 70%, preferably at least 90%, preferably more than 90% of the energy stored in an amplifier used to amplify the time-stretched laser pulse to be retrieved when amplifying the time-stretched laser pulse. The above-described effects of gain dynamics arise in particular in the case of a gain of this order. In the amplifier, in particular in the at least one amplifier stage or in the amplifier chain, the energy is stored in particular in the form of a population inversion by way of optical pumping, in particular by means of pump lamps, pump diodes or pump laser sources, with the population inversion being cleared by the laser pulse passing through the amplifier and hence the stored energy being retrieved.

According to embodiments of the invention, provision is made for a B-integral for the laser pulse to be greater than 3 rad following the amplification. The effects described here arise in particular in the case of a B-integral of this order. In particular, the B-integral for the laser pulse is greater than 3 rad after passing through the at least one amplifier stage, in particular the amplifier chain, in particular the complete amplifier chain. In this context, the B-integral is a measure for the nonlinear phase shift of the laser pulse in the amplification system. It is defined as $$B = \frac{2\pi}{\lambda} \int n_2 I(z) dz,$$

where I(z) is the optical intensity along the beam axis of the laser beam (z-direction); z is the position in the direction of beam propagation, and consequently propagation direction, and $n_2$ is the nonlinear refractive index which quantifies the Kerr nonlinearity. Consequently $n_2 I(z)$ is the nonlinear change in the refractive index, it easily being possible to identify that the B-integral specifies the entire axial nonlinear phase shift accumulated when passing over a propagation path, in particular the amplifier chain in this case.

According to embodiments of the invention, provision is made for at least one property of a compressor used for compressing the amplified time-stretched laser pulse to be altered in order to at least partly compensate the at least one gain phase contribution. In this way, the compressor can advantageously also contribute to compensating the gain phase contribution. In a preferred embodiment, a grating pitch of the compressor is changed in order to at least partly compensate the at least one gain phase contribution, in particular by virtue of the compressor being mechanically stretched or compressed, or being thermally exposed, in particular heated or cooled. It is also possible for the grating pitch not to be constant along an extent of the compressor but for this to change for example linearly, quadratically or by way of any other or higher function, for example by inhomogeneous compression, stretching and/or thermal exposure of the compressor.

Embodiments of the present invention also provide a method for designing an amplification system for amplifying an ultrashort laser pulse, which method includes the following steps: At least one gain phase contribution is determined, the latter being selected from a group consisting of the gain dynamics phase contribution that arises in the amplification system for an ultrashort laser pulse passing through the amplification system as a change in the nonlinear phase on account of gain dynamics of the amplification system, the gain bandwidth phase contribution that arises in the amplification system for the ultrashort laser pulse passing through the amplification system as a change in the nonlinear phase on account of the gain bandwidth of the amplification system, and a combination of the gain dynamics phase contribution and the gain bandwidth phase contribution, and at least one compensation element is provided, the latter being configured to compensate the determined gain phase contribution. In particular, the at least one compensation element is adapted to match the determined gain phase contribution—as it were to have a complementary or inverse effect. In particular, the compensation element is chosen and configured so that it imparts an additional phase contribution on the laser pulse and/or changes the spectrum of the laser pulse such that the gain phase contribution and/or its influence on the amplified ultrashort laser pulse is compensated. In particular, the compensation element is configured for use within the scope of compensating the gain phase contribution in a method according to the invention for amplifying an ultrashort laser pulse or in one of the above-described embodiments of the method for amplifying an ultrashort laser pulse. In the context of the method for designing the amplification system, the advantages which were already explained in conjunction with the method for amplifying the ultrashort laser pulse arise in particular.

Determining the gain phase contribution means that, in particular, the gain phase contribution is acquired directly or indirectly. If the gain phase contribution is acquired directly, a value for the gain phase contribution is obtained directly, in particular by determining or measuring the gain phase contribution, by calculating the gain phase contribution from at least one other measured variable, or by simulation. If the gain phase contribution is acquired indirectly, it is an influence of the gain phase contribution on the amplified ultrashort laser pulse that is determined, with this influence being used in particular indirectly as a measure for the gain phase contribution. In particular, no value for the gain phase contribution itself is obtained in the process.

According to embodiments of the invention, provision is made for the gain phase contribution arising in the amplification system to be determined by virtue of being determined, preferably measured, by way of a phase measurement—in particular by way of a frequency resolved optical gating (FROG) or spectral phase interferometry for direct electric-field reconstruction (SPIDER). Alternatively or in addition, the gain phase contribution is preferably calculated from a measured spectrum. Alternatively or in addition, the gain phase contribution is preferably calculated from a measurement over time, in particular a measured temporal pulse shape. The gain phase contribution, in particular the gain dynamics phase contribution or the gain dynamics, but also the gain bandwidth phase contribution, can be measured relatively easily over time. Particularly in the case of time-stretched pulses (e.g. on the ns scale), it is possible to measure the pulse shape over time by means of a photodiode, for example, and the spectrum or the nonlinear phase can be calculated therefrom, preferably by way of the known stretching factor and/or knowledge of the CPA system.

Alternatively or in addition, the gain phase contribution is preferably determined, in particular calculated, by way of simulation, in particular numerical simulation. The methods specified here facilitate a particularly precise and meaningful determination of the gain phase contribution.

According to embodiments of the invention, provision is made for the compensation element to be designed by virtue of at least one additional phase contribution for the laser pulse and/or a spectrum of the laser pulse being set dynamically, in particular by means of a controllable modulator, in particular a controllable spatial light modulator (SLM), an acousto-optic modulator, an electro-optic modulator, and/or a controllable stretcher, with at least one measured variable being measured on the amplified ultrashort laser pulse. This step is then repeated with changes to the additional phase contribution and/or the spectrum of the laser pulse, with the at least one measured variable being optimized on the basis of the additional phase contribution and/or the spectrum of the laser pulse. The change in the additional phase contribution and/or in the spectrum of the laser pulse is repeated, in particular iteratively, until an optimum of the at least one measured variable has been found. Consequently, the optimum of the at least one measured variable in particular is searched for as a function of the additional phase contribution and/or the spectrum of the laser pulse, and the correspondingly assigned setting or control of the controllable modulator and/or of the controllable stretcher is remembered, more particularly stored. An optimum of the at least one measured variable is understood to mean, in particular, that the corresponding Strehl ratio of the amplified ultrashort laser pulse, which correlates with the at least one measured variable, is less than 5% smaller than without the gain phase contribution. An optical design for the compensation element is determined by the optimization of the at least one measured variable, in particular in such a way that the compensation element supplies the additional phase contribution and/or the spectrum which is assigned to the optimum of the at least one measured variable. In particular, the optical design for the compensation element then corresponds to the remembered, more particularly stored, setting or control of the controllable modulator and/or the controllable stretcher.

With the aid of the method described here, it is possible to reliably and simultaneously easily determine the optical design for the compensation element. This can be carried out in a real experiment and also by simulation, in particular by a numerical simulation.

To determine the influence of the set additional phase contribution and/or of the set spectrum, the amplified ultrashort laser pulse or the phase of the amplified ultrashort laser pulse is preferably measured. In this case, the amplified ultrashort laser pulse is quantified with the aid of the at least one measured variable following the compression in particular. The associated measurements can be, in particular, a measurement for reconstructing the electric field, an autocorrelation measurement, or a power measurement following a frequency conversion. Then, conclusions about the Strehl ratio, in particular, can be drawn from the at least one measured variable.

Preferably, an LCD (liquid crystal display) or similar apparatus is used as a controllable spatial light modulator. Preferably, a thermally variable stretcher or a stretcher that is adjustable by variable tensile load is used as a controllable stretcher.

According to embodiments of the invention, provision is made for the compensation element to be provided by virtue of the determined optical design for the compensation element being transferred to a permanent optical structure. In this way, it is possible to obtain an easily usable and permanent compensation element which is adapted to match the gain phase contribution with accurate fit. In particular, the setting or control of the controllable modulator, which was remembered, more particularly stored, as assigned to the optimal measured variable, can be transferred to a solid, permanent structure, for example a mirror, a grating, or any other optical element, for example a fiber or the like. In particular, this optical element is designed such that it obtains the same effect on the laser pulse as the remembered, more particularly stored, setting or control of the controllable modulator.

Accordingly, a static stretcher can be designed such that its effect on the laser pulse corresponds to the effect of the correspondingly remembered, more particularly stored setting or control of the controllable stretcher. By way of example, a corresponding structure can be statically written into a stretcher.

In the case of a compensation element formed as an amplifier, the determined optical design for the compensation element can also be transferred to a permanent optical structure in such a way that a doping and/or path length for the laser pulse within the amplifier is chosen in accordance with the determined optical design.

According to embodiments of the invention, provision is made for use to be made of a compensation element selected from a group consisting of a stretcher for stretching the laser pulse in time, a fiber for conducting the laser pulse, a filter, in particular a spectral filter, in particular a reflection filter or a transmission filter, a mirror, a grating, in particular a volume Bragg grating, an amplifier for amplifying the laser pulse, in particular a preamplifier or main amplifier, an electro-optic modulator (EOM), a Pockels cell, an acousto-optic modulator (AOM), and a combination of at least two of the aforementioned elements.

According to embodiments of the invention, provision is made for an amplifier to be used as a compensation element, the gain bandwidth of which is adapted in order to at least partly compensate the at least one determined gain phase contribution. The gain bandwidth of the amplifier being adapted includes the selection of an amplifier with an appropriate gain bandwidth; in turn, this in particular includes a previously used first amplifier with a first, less well adapted gain bandwidth being replaced by a second amplifier with a second, better adapted gain bandwidth.

In a preferred embodiment, the gain bandwidth of the amplifier used as a compensation element is adapted by virtue of a doping of the amplifier being changed. In particular, use is preferably made of a different doping element or a different combination of doping elements. Alternatively or in addition, a number and/or a number density of foreign atoms is changed.

Alternatively or in addition, a path length for the laser pulse within the amplifier, in particular a fiber length of the amplifier embodied as a fiber amplifier, is preferably changed in order to adapt the gain bandwidth.

In particular, the optical design for the compensation element, determined as described above, can be permanently transferred to the optical structure of the amplifier by virtue of the doping and/or the path length, in particular the fiber length, of the amplifier being adapted or chosen accordingly.

Alternatively, an appropriately adapted design for the amplifier can also be determined by virtue of a corresponding laser system being constructed in various variants with different amplifiers, with the amplifiers with different designs, in particular in view of their doping and/or their path length of the laser pulse, being tested in the context of the laser system. It is then possible to carry out an optimization in view of the quality of the compressed laser pulse, with the amplifier considered optimal in view of the quality of the compressed laser pulse, that is to say the amplifier with the optimal doping and/or optimal path length for the laser pulse within the amplifier, being selected from the various amplifiers.

Alternatively, the suitable embodiment of the gain bandwidth, in particular the doping and/or path length of the laser pulse within the amplifier, may also be obtained by calculation or simulation.

Embodiments of the present invention also include an amplification system configured to carry out a method according to the invention for amplifying an ultrashort laser pulse, or one of the preferred embodiments of the method for amplifying an ultrashort laser pulse disclosed above. In this case, the amplification system comprises, in particular, a stretcher for stretching an ultrashort laser pulse in time, and moreover at least one amplifier stage for amplifying the time-stretched laser pulse, and moreover at least one compressor for compressing the amplified time-stretched laser pulse. The amplification system moreover comprises at least one compensation element which is configured and arranged to impart an additional phase contribution on the laser pulse and/or to change a spectrum of the laser pulse, in such a way that the at least one gain phase contribution downstream of the compressor—in the propagation direction—is compensated. In particular the advantages that have been explained in connection with the method are obtained in connection with the amplification system.

Typically, laser systems for producing ultrashort laser pulses are designed such that notable nonlinearities occur at the end of a final amplifier stage, that is to say when the pulse energy is at a maximum. As a result of the nonlinearities the pulse obtains an additional phase, the shape of which is given by the pulse shape which in turn is determined by the stretching and the spectrum of the laser pulse. A good pulse quality can be obtained if the entire phase of the laser pulse can be compensated in the compressor of the laser system—by stretching, dispersion and nonlinearities. In particular, it is also necessary to compensate the phase arising from the nonlinearities, with this phase being able to adopt a profile that can only be compensated poorly using a compressor, inter alia on account of the gain dynamics and/or the gain bandwidth. Then, a good pulse quality can only be obtained if either the phases in the laser system—in particular for the stretcher—are designed so that the phase is pre-compensated by the nonlinearities or the laser system is designed, for example by spectral filters or by way of a suitable adaptation of the amplifier, so that the pulse shape produces a nonlinear phase which can be compressed well together with the remaining phase contributions.

The description of the methods on the one hand and of the amplification system on the other hand should be understood to complement one another. In particular, features of the amplification system which were explicitly or implicitly explained in conjunction with the methods preferably are individual or combined features of a preferred exemplary embodiment of the amplification system. The amplification system preferably comprises at least one feature which is a result of at least one step of one of the methods according to the invention or an embodiment of one of the methods. Analogously, method steps described explicitly or implicitly in conjunction with the amplification system preferably are individual or combined steps of a preferred embodiment of one of the methods. These are preferably distinguished by at least one method step which is a result of at least one feature of an amplification system according to the invention or of a preferred amplification system.

FIG. 1 shows a schematic representation of an exemplary embodiment of an amplification system 100, which is configured to carry out a method for amplifying an ultrashort laser pulse. The amplification system 100 comprises a laser pulse source 200 which is designed in particular as an ultrashort pulse laser and is configured to produce laser pulses, preferably with a temporal width in the range of ps to fs.

Moreover, the amplification system 100 comprises a stretcher 120 which is configured to stretch a laser pulse produced by the laser pulse source 200 in time such that a time-stretched laser pulse is obtained. Moreover, the amplification system 100 comprises at least one amplifier stage, in this case an amplifier chain with two amplifier stages, specifically a preamplifier 140 and a main amplifier 150, with the amplifier chain being configured to amplify the time-stretched laser pulse and thus obtain an amplified and time-stretched laser pulse. Finally, the amplifier system 100 comprises a compressor 160 which is configured to compress the amplified and time-stretched laser pulse, as a result of which an amplified ultrashort laser pulse is ultimately obtained.

Gain dynamics which lead to pulse deformation of the laser pulse occur in the amplification system 100, in particular in the amplifier chain, in this case in the preamplifier 140 and in the main amplifier 150, in particular when a high proportion of the energy stored in the amplifier stages is retrieved. A pulse deformation can alternatively or additionally also occur on account of a gain bandwidth of the amplifier chain. In combination with nonlinear effects occurring in the amplifier stages, the pulse deformation in turn leads to a gain phase contribution, in particular a gain dynamics phase contribution, a gain bandwidth phase contribution, or a combination of the gain dynamics phase contribution and the gain bandwidth phase contribution, with the gain phase contribution ultimately impairing the quality of the compressed, amplified ultrashort laser pulse.

To reduce this negative effect, preferably to entirely suppress it, the amplification system 100 in this case comprises at least one compensation element 130, which is configured to compensate the gain phase contribution, that is to say in particular an influence of the gain phase contribution. In particular, an additional phase contribution is imparted on the laser pulse in the propagation direction upstream of the compressor 160 and/or a spectrum of the laser pulse is changed—in particular in propagation direction upstream of the preamplifier 140 or upstream of the main amplifier 150 and/or in propagation direction downstream of the preamplifier 140 or downstream of the main amplifier 150 and/or in the preamplifier 140 or in the main amplifier 150—in such a way that the gain phase contribution is compensated for downstream of the compressor 160. As a result, it is possible to obtain a high quality compressed laser pulse. In particular, the compensation element 130 is designed such that a Strehl ratio of the laser pulse is no more than 5% smaller than in the case of a complete avoidance or complete compensation of the gain phase contribution.

The compensation element 130 is plotted schematically here and in exemplary fashion at various sites along the propagation path. It can be arranged immediately upstream of the stretcher 120, immediately downstream of the stretcher 120, immediately upstream of the preamplifier 140 or between the preamplifier 140 and the main amplifier 150, that is to say within the amplifier chain in particular. An arrangement downstream of the main amplifier 150 or downstream of the compressor 160 or in the compressor 160 is also possible. However, the spectrum is preferably adapted upstream of the main amplifier 150 or in the main amplifier 150. It is also possible for a plurality of compensation elements 130 to be provided, which in particular may be provided at the locations accordingly indicated here in schematic fashion.

The stretcher 120 itself can also be designed as a compensation element 130, in particular by virtue of being variably designed or by virtue of a compensation property being statically written into said stretcher.

An amplifier of the amplifier chain, in particular the preamplifier 140 or the main amplifier 150, can also be designed as a compensation element 130, in particular by way of a suitably adapted gain bandwidth, in particular by way of a suitable choice of the doping and/or of the path length for the laser pulse within the amplifier, in particular a fiber length of the amplifier.

It is also possible for at least one property of the compressor 160 to be changed in order to at least partly compensate the at least one gain phase contribution. Thus, even the compressor 160—in particular in combination with a further compensation element 130—can be used as a compensation element.

In particular, the compensation element 130 is selected from a group consisting of the stretcher 120, a fiber 110, in particular with a written fiber Bragg grating (FBG), a filter, in particular a spectral filter, in particular a reflection filter or a transmission filter, a mirror, an electro-optic modulator (EOM), a Pockels cell, an acousto-optic modulator (AOM), a grating, in particular a volume Bragg grating, an amplifier for amplifying the laser pulse, in particular the preamplifier 140 or the main amplifier 150, and a combination of at least two of the aforementioned elements.

In particular, imparting the additional phase contribution and/or changing the spectrum can be carried out when stretching the ultrashort laser pulse. Alternatively or in addition, this can occur before the ultrashort laser pulse is stretched. Alternatively or in addition, this can occur after the ultrashort laser pulse has been stretched and before the time-stretched laser pulse is amplified. Alternatively or in addition, this can occur when the time-stretched laser pulse is amplified.

In particular, the additional phase contribution can be imparted on the laser pulse by virtue of using a stretcher 120 into or onto which a suitably adapted time-of-flight profile is written or impressed on the basis of the wavelength for the ultrashort laser pulse. The properties of the stretcher 120 can be variable, in particular thermally variable or variable as a result of applying a tensile stress.

In particular, use is preferably made of a stretcher 120, with the suitably adapted time-of-flight profile being statically written into or dynamically impressed onto the stretcher on the basis of the wavelength.

The change in the spectrum is preferably undertaken by virtue of using a stretcher 120 into or onto which a spectral filter is written or impressed. Alternatively or in addition, the spectrum is changed by virtue of the ultrashort laser pulse being filtered by way of a spectral filter upstream or downstream of the stretcher. Thus, the compensation element 130 can be embodied as a spectral filter in particular, preferably as a reflective spectral filter, that is to say as a wavelength-dependent mirror, or as a transmission filter.

Alternatively or in addition, the spectrum of the laser pulse is preferably changed by virtue of the ultrashort laser pulse being guided, either upstream of the stretcher 120 or downstream of the stretcher 120, through a fiber 110 into which a spectral filter has been written.

Alternatively or in addition, the laser pulse is preferably filtered and/or spectrally shaped before or while running through an amplifier of the amplifier chain in which or downstream of which self-phase modulation occurs, with this being able to be the main amplifier 150 in particular, but also the preamplifier 140—depending on the specific design of the amplifier chain and, in particular, the preamplifier 140 and the main amplifier 150.

In particular, the spectrum of the time-stretched laser pulse is preferably changed, in particular spectrally shaped, by virtue of the laser pulse passing through at least one amplifier, in particular selected from the preamplifier 140 and the main amplifier 150, within the amplifier chain, the gain bandwidth of said amplifier being suitably adapted in order to at least partly compensate the at least one gain phase contribution. The gain bandwidth of this amplifier is preferably suitably adapted by virtue of the amplifier having a suitably adapted doping and/or a suitably adapted path length for the laser pulse within the amplifier, in particular a suitably adapted fiber length.

Preferably, at least 30% of the energy stored in the preamplifier 140 and/or in the main amplifier 150, in particular in one of these amplifiers, preferably in each case in both amplifier stages, is retrieved.

The preamplifier 140 and the main amplifier 150 are preferably designed—optionally taking account an interposed compensation element 130—so that a B-integral for the laser pulse after the amplification, that is to say downstream of the main amplifier 150 in the propagation direction, is greater than 3 rad.

FIG. 2 shows a schematic representation of an apparatus, which is configured to carry out a method for designing the amplifier system 100. Elements that are the same or functionally the same are provided with the same reference signs, and so reference is respectively made to the above description.

Now, a controllable modulator 300 or a controllable stretcher 120, which can be controlled by a computing device 500, is provided at the site where the compensation element 130 should subsequently be provided in the fully designed amplification system 100. The controllable modulator 300 is preferably a controllable spatial light modulator (SLM), preferably designed as an LCD. Alternatively, the controllable modulator 300 can also be an acousto-optic modulator or an electro-optic modulator. In this case too—in a manner analogous to FIG. 1—a modulator 300 need not in fact be provided at every location where such an element is plotted using dashed lines; rather, the positions represented in dashed lines denote those sites within the apparatus where such a modulator 300 can be arranged. Instead of such a light modulator 300 or in addition to such a modulator 300, it is also possible to use a controllable stretcher 120 for stretching the ultrashort laser pulse in time. In this respect, for the purposes of its control, the stretcher 120 is also operatively connected to the computing device 500 in this case. Thus, an embodiment in which only the stretcher 120 has a controllable configuration, and with no further modulator 300 being provided, is possible. Furthermore, an embodiment in which the stretcher 120 does not have a controllable embodiment, and exactly one modulator 300 is provided, in particular at one of the sites denoted here, is also possible. However, it is also possible for a plurality of light modulators 300 to be provided, with the stretcher 120 not having a controllable embodiment. Finally, a combination of a controllable stretcher 120 with at least one modulator 300, in particular also with multiple modulators 300, is also possible.

In general, the amplification system 100 is preferably designed by virtue of the gain phase contribution for the amplified ultrashort laser pulse being determined, with at least one compensation element 130—which may also be an appropriately adapted stretcher 120—being provided and being configured to compensate the determined gain phase contribution.

The gain phase contribution arising in the amplification system 100 is preferably determined by phase measurement, in particular by a frequency resolved optical gating, and/or calculated from a spectrometric measurement or a temporal measurement, and/or determined, more particularly calculated, by simulation, in particular by a numerical simulation.

In particular, the compensation element 130 is designed by virtue of at least one additional phase contribution for the laser pulse, and/or a spectrum of the laser pulse, being set dynamically, in particular by means of the at least one controllable modulator 300 and/or the controllable stretcher 120. In this case, at least one measured variable is measured on the amplified ultrashort laser pulse. This is repeated—optionally multiple times—with changes to the additional phase contribution and/or the spectrum of the laser pulse, with the at least one measured variable being optimized on the basis of the additional phase contribution for the laser pulse and/or on the basis of the spectrum of the laser pulse. In this case, both determining the at least one measured variable and controlling the controllable modulator 300 and/or the controllable stretcher 120, that is to say consequently the setting of the additional phase contribution, is preferably implemented by the computing device 500. The optimization is preferably likewise carried out by the computing device 500. An optimum of the at least one measured variable is understood to mean, in particular, that the corresponding Strehl ratio of the amplified ultrashort laser pulse is at least less than 5% smaller than in the case of complete avoidance or complete compensation of the gain phase contribution. This determination of the optimum can also be implemented iteratively, for example as possible in the case of the FROG measurement.

In this way, a setting for the controllable modulator 300 and/or the controllable stretcher 120 is ultimately determined, in the case of which the at least one measured variable is optimal. This then corresponds to the sought optical design for the compensation element 130, which is determined in this way.

Finally, the compensation element 130 then is preferably provided by virtue of the optical design for the compensation element 130 determined thus being transferred to a permanent optical structure. By way of example, this can manifest itself in, in particular be statically written into, an appropriately designed spectral filter, a volume Bragg grating or else the stretcher 120; or a variably controllable stretcher or an optical modulator, in particular an electro-optic modulator or acousto-optic modulator, can be controlled accordingly. It is also possible that a suitably adapted gain bandwidth is chosen for at least one amplifier, in particular the preamplifier 140 and/or the main amplifier 150, or that the preamplifier 140 and/or the main amplifier 150 is chosen such that it has an appropriately adapted gain bandwidth. In particular, a suitably adapted doping and/or a suitably adapted path length of the laser pulse within the amplifier, in particular a suitably adapted fiber length, can be chosen to this end.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for amplifying an ultrashort laser pulse, comprising the following steps:
   a) stretching the ultrashort laser pulse in time and obtaining a time-stretched laser pulse;
   b) amplifying the time-stretched laser pulse and obtaining an amplified time-stretched laser pulse;
   c) compressing the amplified time-stretched laser pulse and obtaining an amplified ultrashort laser pulse, with
   at least one gain phase contribution selected from a group consisting of a gain dynamics phase contribution of the laser pulse that emerges as a change in a nonlinear phase on account of gain dynamics in step b), a gain bandwidth phase contribution of the laser pulse that emerges as a change in the nonlinear phase on account of a gain bandwidth in step b), and a combination of the gain dynamics phase contribution and the gain bandwidth phase contribution, being compensated by virtue of
   d) an additional phase contribution being imparted on the laser pulse prior to step c) and/or
   e) a spectrum of the laser pulse being changed,
   in such a way that the at least one gain phase contribution is compensated after step c).

2. The method as claimed in claim 1, wherein at least one step, selected from steps d) and e),
   is carried out when the ultrashort laser pulse is stretched according to step a), and/or
   is carried out before the ultrashort laser pulse is stretched according to step a), and/or
   is carried out after the ultrashort laser pulse has been stretched according to step a) and before the time-stretched laser pulse is amplified according to step b), and/or
   is carried out when the time-stretched laser pulse is amplified according to step b).

3. The method as claimed in claim 1, wherein step d) is carried out by virtue of a stretcher for stretching the ultrashort laser pulse being used in step a), and a suitably adapted time-of-flight profile being written into or impressed onto the stretcher on the basis of a wavelength for the ultrashort laser pulse.

4. The method as claimed in claim 3, wherein the suitably adapted time-of-flight profile is statically written into or dynamically impressed onto the stretcher on the basis of the wavelength.

5. The method as claimed in claim 1, wherein step e) is carried out by virtue of
   a stretcher for stretching the ultrashort laser pulse being used in step a), a spectral filter being written therein or impressed thereon, and/or
   the laser pulse being filtered by way of a spectral filter upstream or downstream of the stretcher, and/or
   the laser pulse being guided through a fiber upstream or downstream of the stretcher, a spectral filter being written into the fiber, and/or
   the laser pulse being filtered and/or spectrally shaped before or while it passes through an amplifier, in which or downstream of which self-phase modulation occurs.

6. The method as claimed in claim 1, wherein the time-stretched laser pulse is amplified in step b) by an amplifier chain, the amplifier chain comprising a plurality of amplifiers, with step e) being carried out by virtue of the laser pulse passing through at least one amplifier of the plurality of amplifiers within the amplifier chain, the gain bandwidth of the amplifier being suitably adapted in order to at least partly compensate the at least one gain phase contribution.

7. The method as claimed in claim 6, wherein at least one amplifier of the plurality of amplifiers is used for step e), the gain bandwidth of the amplifier being suitably adapted by virtue of the at least one amplifier having
   a suitably adapted doping, and/or
   a suitably adapted path length for the laser pulse within the amplifier.

8. The method as claimed in claim 1, wherein at least 30% of the energy stored in an amplifier, by means of which the time-stretched laser pulse is amplified, is retrieved in step b).

9. The method as claimed in claim 1, wherein a B-integral for the laser pulse is greater than 3 rad following the amplification in step b).

10. The method as claimed in claim 1, wherein at least one property of a compressor used in step c) for compressing the amplified time-stretched laser pulse is altered in order to at least partly compensate the at least one gain phase contribution.

11. A method for designing an amplification system for amplifying an ultrashort laser pulse, the method comprising the following steps:
    determining at least one gain phase contribution which is selected from a group consisting of a gain dynamics phase contribution that arises in the amplification system for an ultrashort laser pulse passing through the amplification system as a change in the nonlinear phase on account of gain dynamics of the amplification system, a gain bandwidth phase contribution that arises in the amplification system for the ultrashort laser pulse passing through the amplification system as a change in the nonlinear phase on account of a gain bandwidth of the amplification system, and a combination of the gain dynamics phase contribution and the gain bandwidth phase contribution, and
    providing at least one compensation element which is configured to compensate the at least one gain phase contribution by way of the method as claimed in claim 1.

12. The method as claimed in claim 11, wherein the at least one gain phase contribution arising in the amplification system
is determined by phase measurement, and/or
is calculated from a spectrometric measurement, and/or
is calculated from a time measurement, and/or
is determined by simulation.

13. The method as claimed in claim 11, wherein the compensation element is designed by virtue of
f) at least an additional phase contribution for the laser pulse and/or a spectrum of the laser pulse being set dynamically, by means of a controllable spatial light modulator and/or a controllable stretcher, with at least one measured variable being determined on the amplified ultrashort laser pulse, with
g) step f) being repeated with changes to the additional phase contribution and/or the spectrum of the laser pulse, with the at least one measured variable being optimized on the basis of the additional phase contribution for the laser pulse and/or the spectrum of the laser pulse, with
h) an optical design for the compensation element being determined by optimizing the at least one measured variable in step g).

14. The method as claimed in claim 13, wherein the compensation element is provided by virtue of the optical design for the compensation element determined in step h) being transferred to a permanent optical structure.

15. The method as claimed in claim 11, wherein use is made of a compensation element selected from a group consisting of a stretcher for stretching the laser pulse in time, a fiber for conducting the laser pulse, a spectral filter, a mirror, a grating, an amplifier for amplifying the laser pulse, an electro-optic modulator, a Pockels cell, an acousto-optic modulator, and a combination of at least two of the aforementioned elements.

16. The method as claimed in claim 15, wherein the spectral filter comprises a reflection filter or a transmission filter.

17. The method as claimed in claim 15, wherein the grating comprises a volume Bragg grating.

18. The method as claimed in claim 15, wherein the amplifier comprises a preamplifier or main amplifier.

19. The method as claimed in claim 11, wherein an amplifier is used as a compensation element, a gain bandwidth of which is adapted in order to at least partly compensate the at least one gain phase contribution.

20. The method as claimed in claim 19, wherein the gain bandwidth of the amplifier used as the compensation element is adapted by virtue of
a doping and/or
a path length for the laser pulse within the amplifier, of the amplifier being changed.

* * * * *